US008155607B2

(12) United States Patent
Kim

(10) Patent No.: US 8,155,607 B2
(45) Date of Patent: Apr. 10, 2012

(54) ANTENNA APPARATUS OF PORTABLE TERMINAL

(75) Inventor: Hyung Rak Kim, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 350 days.

(21) Appl. No.: 12/429,010

(22) Filed: Apr. 23, 2009

(65) Prior Publication Data

US 2009/0285262 A1 Nov. 19, 2009

(30) Foreign Application Priority Data

May 16, 2008 (KR) ........................ 10-2008-0045327

(51) Int. Cl.
*H04B 1/04* (2006.01)

(52) U.S. Cl. ...................... 455/129; 455/575.7; 343/702

(58) Field of Classification Search ............... 455/575.7, 455/129, 121, 125; 343/702, 700, 829, 846
See application file for complete search history.

(56) References Cited

U.S. PATENT DOCUMENTS

2006/0281423 A1 * 12/2006 Caimi et al. .................. 455/129

* cited by examiner

*Primary Examiner* — Lincoln Donovan
*Assistant Examiner* — Shikha Goyal
(74) *Attorney, Agent, or Firm* — Jefferson IP Law, LLP

(57) ABSTRACT

An antenna apparatus of a portable terminal and method for implementing characteristics of the antenna apparatus of the portable terminal are disclosed. The antenna apparatus includes a circuit board including a power feeder and a ground, a radiation unit, a power feeder connecting unit for electrically connecting the power feeder to the radiation unit and for feeding electric power to the radiation unit, and a ground connecting unit including at least two paths which have different lengths for electrically connecting the ground to and disconnecting the ground from the radiation unit selectively.

11 Claims, 8 Drawing Sheets

ANTENNA APPARATUS OF PORTABLE TERMINAL

PRIORITY

This application claims the benefit of a Korean patent application filed in the Korean Intellectual Property Office on May 16, 2008 and assigned Serial No. 10-2008-0045327, the entire disclosure of which is hereby incorporated by reference.

BACKGROUND OF THE INVENTION

1. Field of the Invention

The present invention relates to an antenna apparatus of a mobile terminal. More particularly, the present invention relates to an antenna apparatus of a mobile terminal and a method for implementing characteristics of an ultra-wideband antenna of a mobile terminal using an antenna having narrow-band characteristics.

2. Description of the Related Art

With advances in mobile communication technologies and demands for various services, mobile communication services are continuously evolving. Early mobile communication services focused on simple vocal communications only. Recently, various mobile communication services, such as a multimedia service providing music and movies, a wireless mobile internet service enabling a user to have high-speed internet access and a satellite communication service providing an international roaming service are being developed. In mobile communication service technologies, ultra-wideband mobile communication using ultra-wideband technology is being developed via a Personal Communication Services (PCS) mobile communication system and a Wideband Code Division Multiple Access (WCDMA) mobile communication system, as well as other conventional cellular communication systems. If the various mobile communication services are provided to a single mobile terminal at various frequency bands, the convenience and utility mobile terminal will be increased. Hence, broadband wireless terminals are now widely used and a technology enabling an antenna of the wireless terminal to operate in a broadband environment is required.

A conventional mobile terminal has a small antenna. The small antenna provides inferior radiation efficiency, a narrow frequency band and a small gain. Thus, there is a need to develop miniaturized, multi-functional and high-performance antennas to be employed in the mobile communication system. An existing antenna of a mobile terminal is a ¼ wavelength monopole type or a helical type protruding over the mobile terminal, which is not strong and is inconvenient when transporting the mobile terminal. Research and development with respect to internal antennas is ongoing to address shortcomings of the antenna. With the miniaturization and internalization of the antenna, a Planar Inverted F Antenna (PIFA) is being implemented as an internal antenna in a mobile terminal due to a simple manufacturing process and a flat structure.

However, the internal antenna has a restriction in size when being installed into a narrow space of a mobile terminal. With the miniaturization, input impedance becomes a large capacitive reactance against low resistance. In this case, when the reactance is canceled using a matching circuit, narrow-band characteristics are exhibited. Furthermore, due to the low resistance characteristics, radiation efficiency of an antenna is significantly lowered. Since thickness of a mobile terminal must be considered in order to install the PIFA into the mobile terminal, a height restriction exists for the PIFA. However, the internal antenna has a limit for obtaining a wide broadband capability. Since the portable terminal is restricted in size, a physical limit exists in order to provide a small light ultra-wideband antenna in the portable terminal.

Therefore, a need exists for an antenna apparatus of a mobile terminal and a method for implementing characteristics of an ultra-wideband antenna of the antenna apparatus.

SUMMARY OF THE INVENTION

An aspect of the present invention is to address at least the above-mentioned problems and or disadvantages and to provide at least the advantages described below. Accordingly, an aspect of the present invention is to provide an antenna apparatus with ultra-wideband characteristics using an antenna having narrow-band characteristics.

Another aspect of the present invention is to provide an antenna apparatus for implementing a plurality of wideband characteristics using a single antenna and for selecting one of the implemented wideband characteristics.

In accordance with an aspect of the present invention, an antenna apparatus of a portable terminal is provided. The apparatus includes a circuit board including a power feeder and a ground; a radiation unit, a power feeder connecting unit for electrically connecting the power feeder to the radiation unit and for feeding electric power to the radiation unit, and a ground connecting unit including at least two paths which have different lengths for electrically connecting and disconnecting the ground to and from the radiation unit.

The ground connecting unit further comprises switches connected to the paths, respectively, for electrically connecting the ground to and disconnecting the ground from the radiation unit according to paths selected by the switches.

Each of the switches connects the ground to and disconnects the ground from the radiation unit at high speed such that frequency bands generated by a connection of the paths are overlapped with each other.

Each of the switches selects one of the paths for selecting one of the frequency bands generated by the connection of the paths.

The paths include a ground plate connected to the radiation unit, a ground clip connected to the ground plate, and at least two ground lines having different lengths for connecting the ground clip to the switches.

The power feeder connecting unit includes a power feeding plate connected to the radiation unit, a power feeding clip connected to the power feeding plate, and a power feeding line for connecting the power feeding clip to the power feeder.

The radiation unit is spaced apart from the circuit board. Moreover, the radiation unit includes a Planar Inverted F Antenna (PIFA) type radiation unit fed with current from the power feeder of the circuit board through the power feeder connecting unit for providing the fed current flow to the ground through at least one path of the ground connecting unit.

Accordingly, different frequency bands are overlapped with each other to achieve an antenna with an ultra-wideband frequency by means of a radiation unit of the antenna with narrow-band characteristics. Moreover, a necessary frequency band may be selected from different frequency bands. Thus, a plurality of frequency bands may be used by a single antenna.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
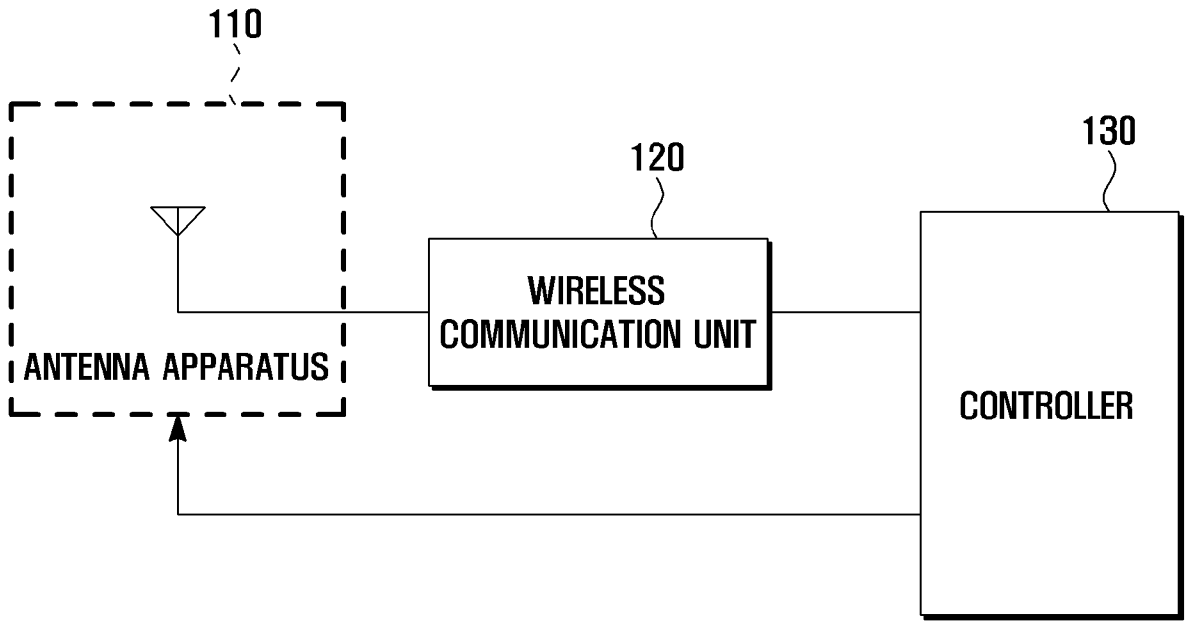
FIG. 1 is a schematic view illustrating a portable terminal employing an antenna apparatus according to an exemplary embodiment of the present invention.

An exemplary schematic configuration of a portable terminal employing an antenna apparatus according to an exemplary embodiment of the present invention will be described. FIG. 1 is a schematic view illustrating a portable terminal employing an antenna apparatus according to an exemplary embodiment of the present invention.

Referring to FIG. 1, a portable terminal employing an antenna apparatus includes an antenna apparatus 110, a wireless communication unit 120 and a controller 130.

The antenna apparatus 110 has basic functions for selectively receiving high frequency signals of a frequency band of a corresponding wireless communication protocol or radiating the high frequency signals of the corresponding frequency band in the air.

The antenna apparatus 110 includes a plurality of paths with narrow-band frequency characteristics. In an exemplary implementation, when respective frequency bands of the paths are overlapped with each other, an antenna with ultra-wideband frequency characteristics may be achieved. Moreover, one path is selected from the plurality of paths so that an antenna with a specific frequency band may be achieved.

The wireless communication unit 120 performs a series of communications for transmitting and receiving user data and voice signals to other portable terminals wirelessly. The wireless communication unit 120 includes a transmitter Tx for transmitting a modulated signal received from the controller 130 to the antenna apparatus 110 by converting the modulated signal into a high frequency signal and amplifying the same. The wireless communication unit 120 also includes a receiver Rx for sequentially receiving the high frequency signal, amplifying the received high frequency signal in a low noise manner and converting the high frequency signal into a baseband signal to provide the converted signal to the controller 130.

The controller 130 controls the antenna apparatus 110 to adjust the frequency band. In this case, the frequency band of the antenna apparatus may be adjusted into a wideband frequency band or into a specific frequency band. The controller 130 controls the antenna apparatus 110 to adjust the frequency band of the antenna apparatus 110 into a wideband frequency. Moreover, the controller 130 controls the antenna apparatus 110 to have characteristics corresponding to a specific frequency.

The controller 130 modulates the voice signal received from an audio processor after conversion through coding and interleaving, and provides the modulated voice signal to the wireless communication unit 120. The controller 130 generates a voice signal received from the wireless communication unit 120 via a process, such as demodulation, equalization, decoding, interleaving and the like, and outputs the generated voice signal. In order to perform functions of the controller 130, the controller 130 includes a Modulator-Demodulator (MODEM) and a Compressor-Decompressor (CODEC). In this case, the CODEC includes a data CODEC processing a packet data, an audio CODEC processing an audio signal, such as a voice signal, and a video CODEC processing a video signal.

Although not illustrated, a portable terminal, to which the antenna apparatus according to an exemplary embodiment of the present invention is applied, may further include a speaker, a microphone, an audio processor for reproducing an audio signal output from the controller 130 and transmitting the audio signal input from the microphone to the controller 130, an input unit having a plurality of input keys and function keys for performing and setting various functions and transmitting key signals representing alphanumeric information to the controller 130, a storage for storing application programs to perform functions, for storing downloaded contents and for storing user data generated by a user, and a display for visually displaying menus of the portable terminal, for displaying the user data input by the user, for displaying information on a function setting and displaying various information. The portable terminal may further include a Universal Subscriber Identify Module (USIM) as an option. The USIM stores a built-in service identifier. In order to perform the wireless communication in a specific protocol, the service identifier is used during certification and encryption for connecting with a corresponding station and tunneling for the encryption. The USIM may be detachably mounted to the portable terminal. Due to global developments in digital convergence, there are numerous modifications and changes of a portable terminal. Therefore, persons of ordinary skill in the art will appreciate that units similar to the above-mentioned units of the portable terminal may also be provided in the portable terminal to which the antenna apparatus according to an exemplary embodiment of the present invention is applied.

A configuration of an antenna apparatus 110 according to an exemplary embodiment of the present invention will be described below.

Figure 2A:
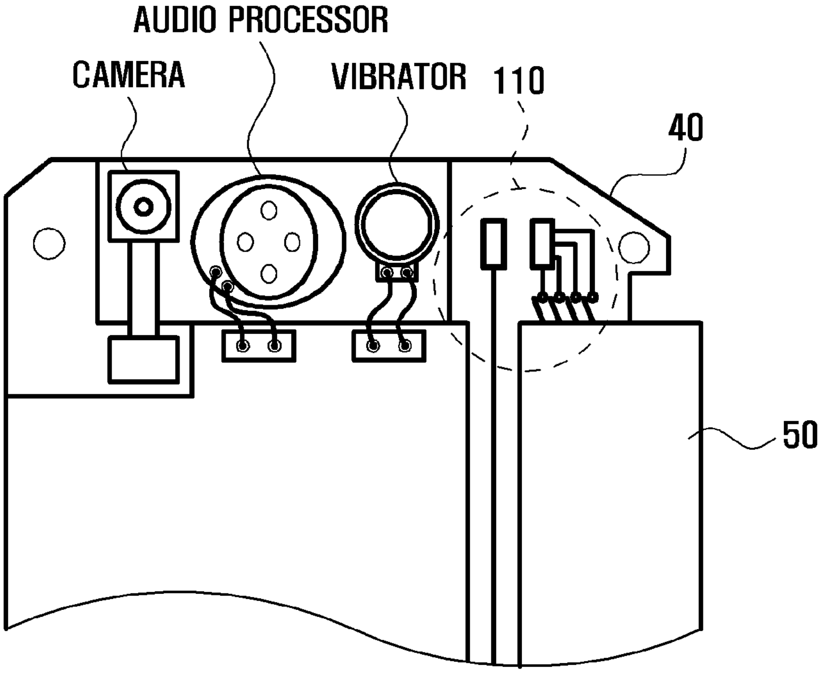
FIGS. 2A to 2D are views illustrating an antenna apparatus according to an exemplary embodiment of the present invention.
Figure 2B:
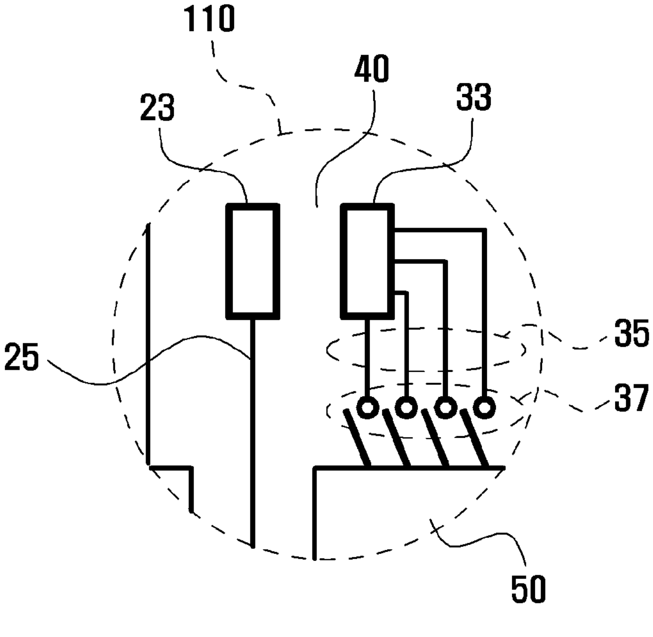
Figure 2C:
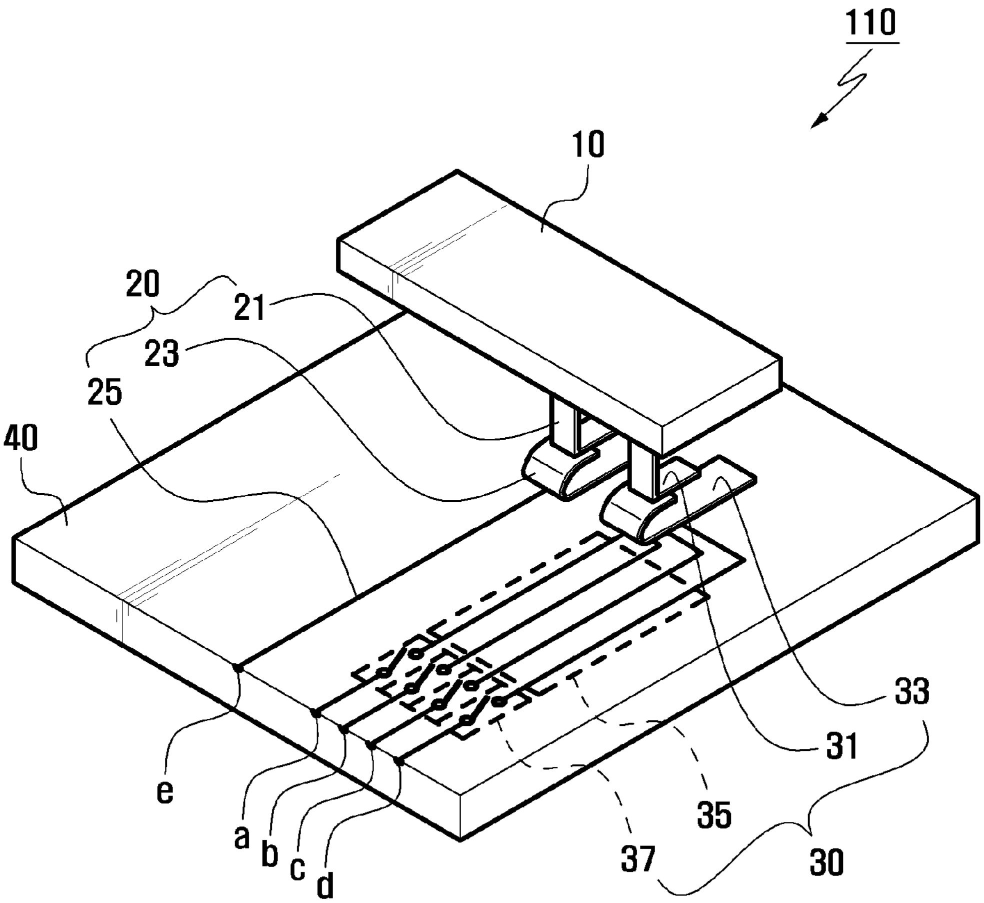
Figure 2D:
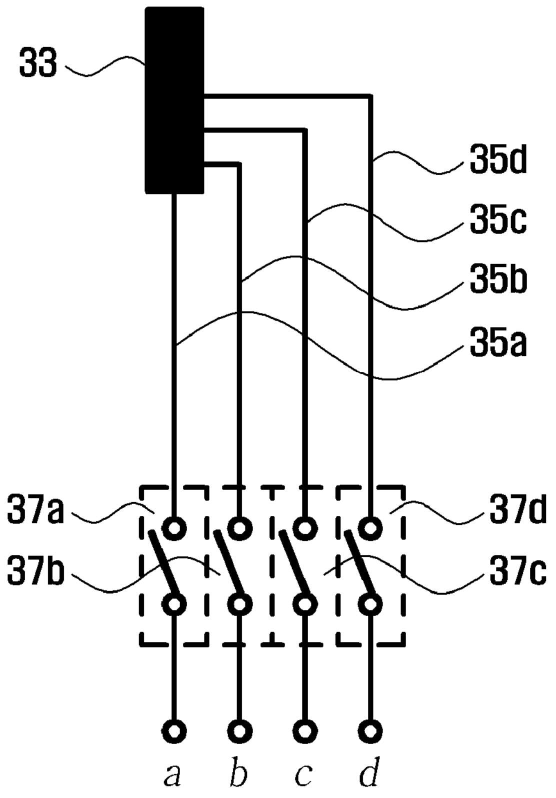

FIGS. 2A to 2D are views illustrating an antenna apparatus 110 according to an exemplary embodiment of the present invention. FIGS. 2A and 2B are plan views illustrating a portion of the antenna apparatus 110, FIG. 2C is a perspective view of the antenna apparatus 110 and FIG. 2D is a view illustrating a portion of the antenna apparatus 110.

Referring to FIG. 2A, an external case of the portal terminal, which may be removed, is partially illustrated. The portable terminal includes a peripheral device, such as a camera, connected to a Printed Circuit Board (PCB) 40 and a ground 50, an audio processor, a vibrator and a portion of the antenna apparatus 110, which are illustrated.

FIG. 2B is an enlarged view illustrating the portion of the antenna apparatus of FIG. 2A. The portion of the antenna apparatus 110 is printed or installed on the PCB 40.

Referring to FIG. 2B, the portion of the antenna apparatus includes a power feeding line 25 connected to a power feeder (not illustrated) for feeding electric power to an antenna and a power feeding clip 23 connected to the power feeding line 25. In this case, a portion of the power feeding line 25 may be formed of a microstrip for excellent high frequency characteristics. The power feeding clip 23 is formed in a clip configuration for easy connection with a power feeding plate 21.

FIG. 2B illustrates the Ground (GND) 50, a switch 37 connected to the ground 50, a ground line 35 connected to the switch 37 and a ground clip 33 connected to the ground line 35. The ground clip 33 is mounted on the PCB 40 and is formed in a clip configuration for easy connection with a ground plate 31.

Referring to FIG. 2C, in the antenna apparatus 110, the power feeding clip 23 and the ground clip 33 are connected to a radiation unit 10 through the power feeding plate 21 and the ground plate 31, respectively. The radiation unit 10 faces the PCB 40 and is spaced apart from the PCB 40.

Referring to FIGS. 2A to 2C, the antenna apparatus 110 includes the PCB 40, the radiation unit 10 installed on the PCB 40 to face the PCB 40 from a distance, a power feeder connecting unit 20 connecting a power feeder (not shown) that feeds electric current (or voltage) to the radiation unit 10 and a ground connecting unit 30 connecting the radiation unit 10 to the ground 50. In the antenna apparatus 110, the radiation unit 10 is fed with electric power by an electrical connection (or Electro-Magnetic (EM) power feeding) between the power feeder connecting unit 20 and the radiation unit. One end of the radiation unit is connected to the ground connecting unit 30 to be electrically shorted such that resonance frequency and impedance matching are achieved.

The radiation unit 10 includes a crooked conductor (not illustrated) that may be formed to have various resonance characteristics or frequency characteristics. Current is fed to the conductor through the power feeder connecting unit 20. The fed current is cut off by the ground connecting unit 30.

The power feeder connecting unit 20 electrically connects the power feeder (not illustrated) to the radiation unit 10. In this connection, the power feeder connecting unit 20 includes a power feeding plate 21, a power feeding clip 23 and a power feeding line 25. The power feeding plate 21, the power feeding clip 23 and the power feeding line 25 are electrically connected to each other such that current (or voltage) fed through the power feeder is delivered to the conductor of the radiation unit 10. The power feeding line 25 may include a microstrip of about 50 ohms that is printed on the circuit board. Due to the microstrip of 50 about ohms, narrow-band impedance matching may be achieved.

The ground connecting unit 30 electrically connects the ground 50 to one end of the radiation unit 10 to ground the radiation unit 10. In this case, the ground connecting unit 30 includes at least two paths having different lengths, and switches 37 respectively corresponding to the paths. When the paths are selected by the switches 37, the selected paths connect the ground 50 to the radiation unit 10 by different lengths. The paths are electrical paths connecting the ground to the radiation unit 10. Each of the paths includes a ground plate 31, a ground clip 33 and ground lines 35. In an exemplary implementation, the ground lines 35 have different lengths so that the paths may be different from each other in length.

In summary, the antenna apparatus 100 according to an exemplary embodiment of the present invention includes the radiation unit 10, the circuit board including the power feeder (not illustrated) and the ground 50, the power feeder connecting unit 20 and the ground connecting unit 30. The radiation unit 10, which is a flat plate, is fed with current from the power feeder of the circuit board 40 through the power feeder connecting unit 20, and provides the fed current flow to the ground 5 through the ground connecting unit 30. In this case, the ground connecting unit 30 includes a plurality of paths and the radiation unit 10 may provide the fed current flow to the ground through at least one of the paths. Accordingly, the antenna apparatus according to an exemplary embodiment of the present invention includes a Planar Inverted F Antenna (PIFA), but is not limited thereto.

FIG. 2D illustrates a plurality of ground lines 35_a_ to 35_d_ and a plurality of switches 37_a_ to 37_d_. As illustrated, first to fourth ground lines 35_a_ to 35_d_ are connected to the first to fourth switches 37_a_ to 37_d_, respectively.

A frequency band of the antenna apparatus 110 may be changed by the lengths of the paths, which are changed by the connection of the switches 37_a_ to 37_d_. A resonance length of the antenna is determined by the length of the conductor from the ground 50 to the radiation unit 10. That is, the resonance length of the antenna may be changed by the lengths of the paths connecting the ground 50 to the radiation unit 10. The paths include the ground plate 31, the ground clip 33 and the ground lines 35_a_ to 35_e_. The ground lines 35_a_ to 35_e_ have different lengths. The lengths of the paths are changed by the connection of the switches 37_a_ to 37_d_ selecting the ground lines 35_a_ to 35_e_. Due to the changed lengths of the paths, the resonance length is also changed.

The relationship between the resonance length and the frequency of the antenna may be expressed by Equation 1 as follows:

$$\lambda = \frac{C}{f},\ C = 3\times 10^{8} \qquad \text{(Equation 1)}$$

wherein λ denotes a resonance length, f denotes a frequency of the antenna and C denotes a constant.

In Equation 1, since the resonance length is inversely proportioned to the frequency of the antenna, the frequency of the antenna is changed by the lengths of the paths determining the resonance length. As a result, when one of the switches 37*a* to 37*d* connecting any one of the first to fourth ground lines 35*a* to 35*d* is selected, any one path is formed and the antenna may have a different frequency according to the length of the corresponding path.

As described above, the antenna has a different resonance length by the connection of the switches 37*a* to 37*d* corresponding to the respective ground lines 35*a* to 35*d*. Moreover, the different resonance lengths have different frequencies and frequency bands. When the switches 37*a* to 37*d* are repeatedly switched at high speed, different frequency bands are overlapped with each other so that an ultra-wideband frequency may be achieved. That is, the high-speed switching forms multiple resonances.

Hereinafter, a method for implementing characteristics of an ultra-wideband antenna, according to an exemplary embodiment of the present invention, using an antenna with narrow-band frequency characteristics will be described.

Figure 3A:
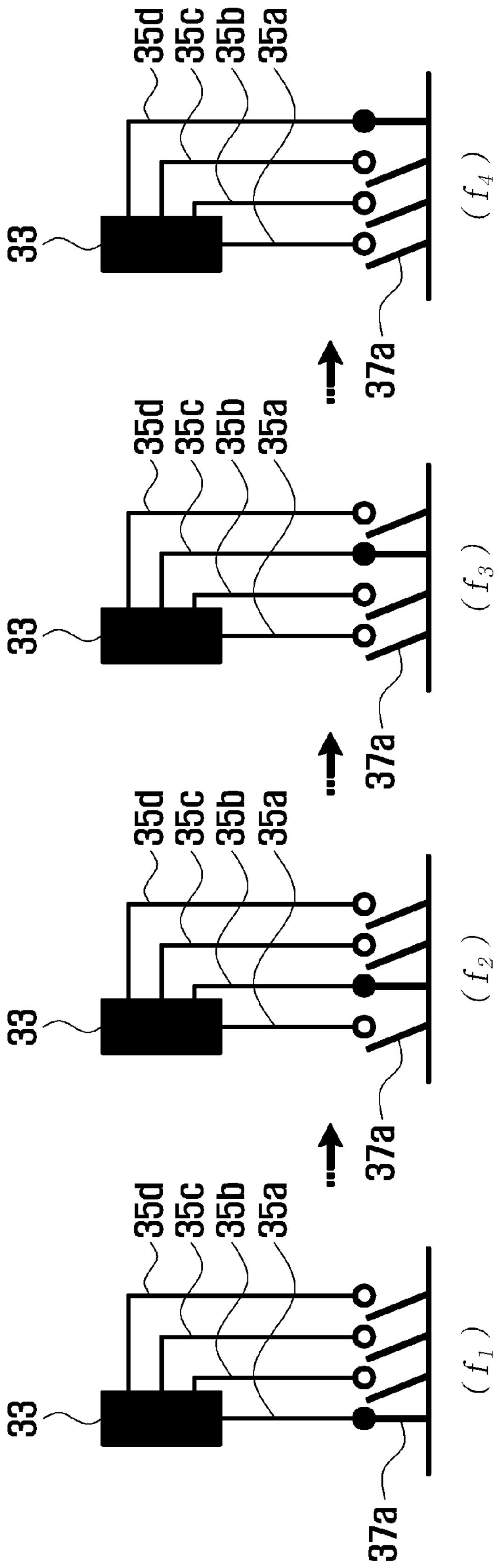
FIGS. 3A and 3B are views illustrating a method for implementing characteristics of an ultra-wideband antenna using an antenna with narrow-band characteristics, according to an exemplary embodiment of the present invention.
Figure 3B:
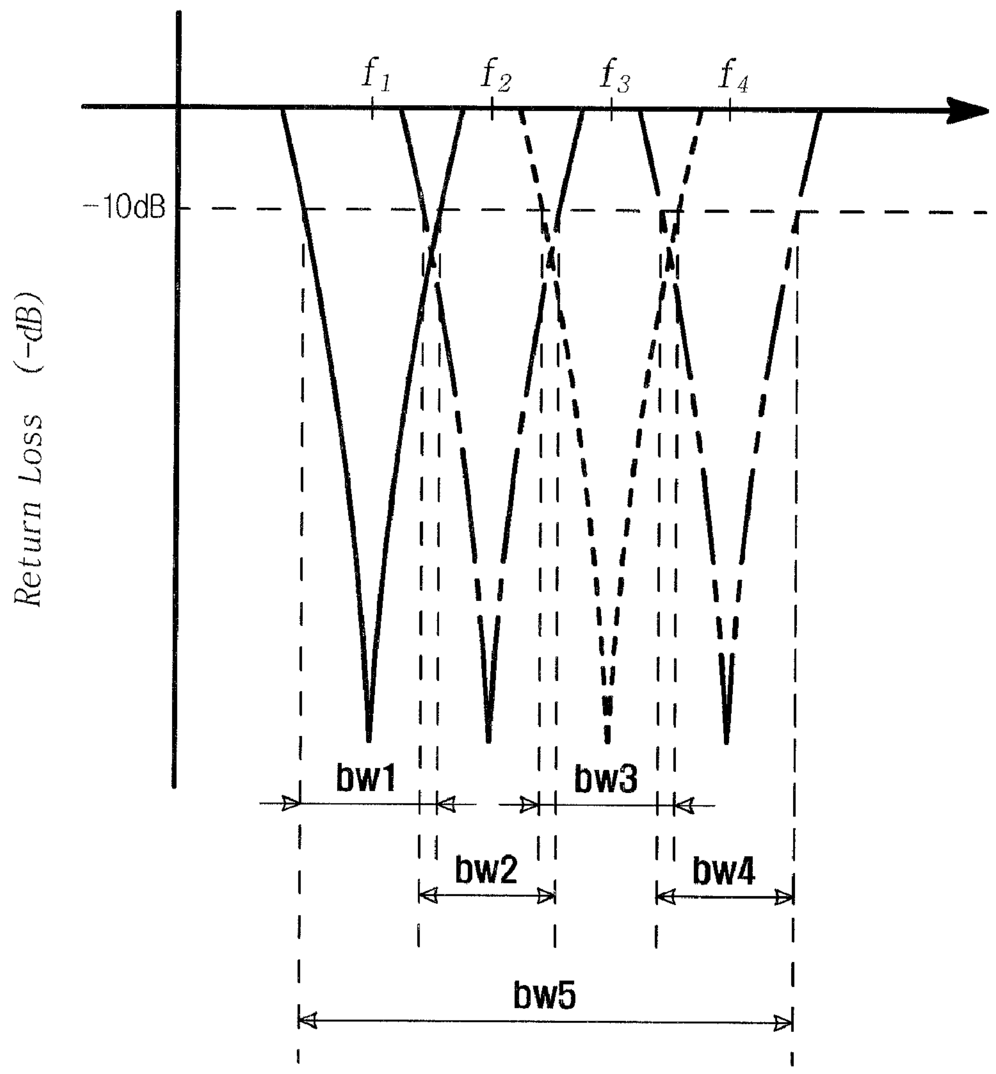

FIGS. 3A and 3B illustrate a method for implementing characteristics of an ultra-wideband antenna using an antenna with narrow-band frequency characteristics.

FIG. 3A illustrates connections between the ground lines 35*a* to 35*e* and the switches 37*a* to 37*e*. When the switches 37*a* to 37*d* are connected to the ground lines 35*a* to 35*d*, the lengths of the paths are changed and the antenna has different resonance lengths. The different resonance lengths have frequencies and frequency bands different from each other. That is, when the first to fourth switches 37*a* to 37*d* are connected, the antenna has first to fourth frequencies f1 to f4 and first to fourth bands bw1 to bw4 corresponding to the frequencies.

FIG. 3B illustrates the frequencies and frequency bands corresponding to the connections of the switches. As illustrated in FIG. 3B, in a case where an output of the antenna has return loss of −10 dB, when the first switch 37*a* is connected to the first ground line 35*a*, the antenna has a narrow-band, that is, the first band bw1. When the second to fourth switches 37*b* to 37*d* are connected to the second to fourth ground lines 35*b* to 35*d*, the antenna has the second to fourth bands bw2, bw3 and bw4.

When high-speed switching of the first to fourth switches 37*a* to 37*d* (connections and disconnections of the respective switches) are repeated with respect to an antenna having the same return loss (−10 dB), the ultra-wideband frequency bw5 may be achieved, since the frequencies f1 to f4 are different due to the respective connections and the frequency bands bw1 to bw4 are overlapped with each other.

Moreover, a necessary frequency band may be selected to use from the first to fourth bands bw1 to bw4, due to the connections between the first to fourth switches 37*a* to 37*d* and the first to fourth ground lines 35*a* to 35*d*.

Accordingly, the ultra-wideband frequency of an antenna with a narrow-band frequency may be achieved without changing a size of the radiation unit 10. Since a tuning time for setting the frequency characteristics of an antenna having a sufficient ultra-wideband frequency is reduced, time and cost for development of a portable terminal may also be reduced.

Figure 4A:
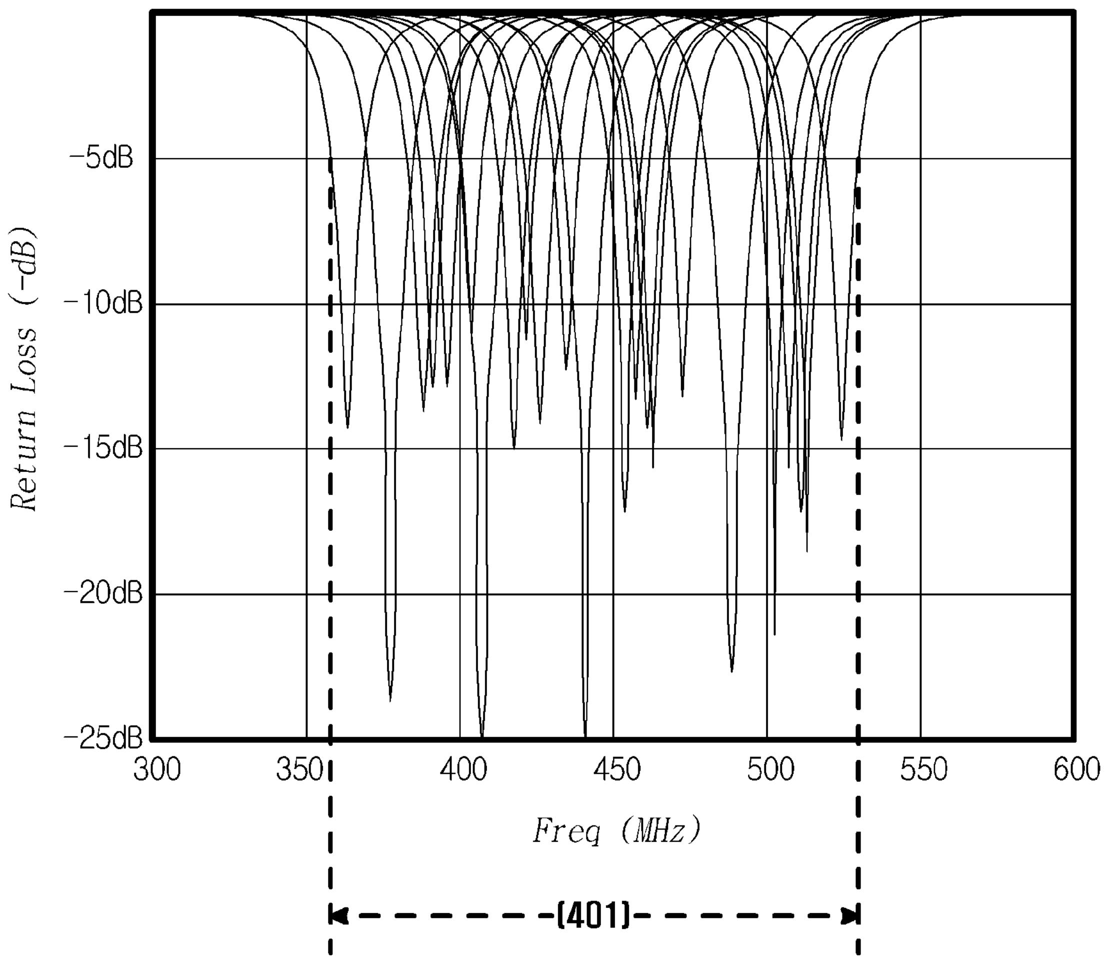
FIGS. 4A and 4B are graphs illustrating effects of an antenna apparatus according to an exemplary embodiment of the present invention.
Figure 4B:
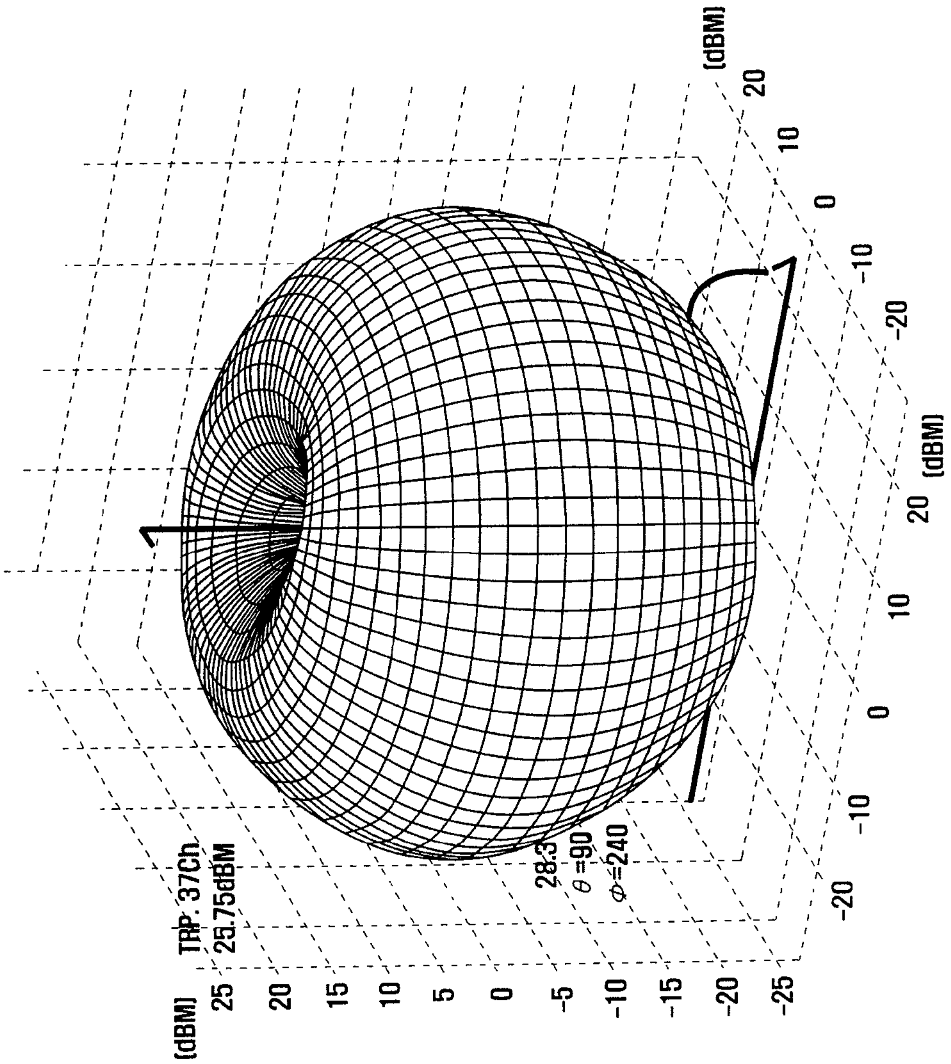

FIGS. 4A and 4B illustrate graphs illustrating effects of the antenna apparatus according to an exemplary embodiment of the present invention.

FIG. 4A illustrates a simulation result of the characteristics of the antenna apparatus according to an exemplary embodiment of the present invention. As illustrated, in a case of the return loss of −10 dB, the high-speed switching is performed such that a plurality of frequency bands with narrow bands is overlapped with each other to implement an ultra-wideband frequency. Moreover, FIG. 4B illustrates a radiation pattern of the antenna apparatus according to an exemplary embodiment of the present invention. As illustrated, since the radiation pattern covers up overall sides of a portable terminal in spite of the characteristics of the ultra-wideband antenna, an omni-directional radiation pattern of an existing antenna is maintained. Thus, reception and radiation characteristics of the antenna do not deteriorate.

While the invention has been described with reference to certain exemplary embodiments thereof, it will be understood by those skilled in the art that various changes in form and details may be made therein without departing from the spirit and scope of the invention as defined by the appended claims and their equivalents.

What is claimed is:

1. An antenna apparatus of a portable terminal, the apparatus comprising:
- a circuit board comprising a power feeder and a ground;
- a radiation unit;
- a power feeder connecting unit for electrically connecting the power feeder to the radiation unit and for feeding electric power to the radiation unit; and
- a ground connecting unit comprising at least two paths of different lengths for electrically connecting the ground to and disconnecting the ground from the radiation unit,
- wherein the ground connecting unit further comprises switches connected to the paths, respectively, for electrically connecting the ground to and disconnecting the ground from the radiation unit according to paths selected by the switches, and each of the switches connects the ground to and disconnects the ground from the radiation unit at high speed such that frequency bands generated by a connection of the paths are overlapped with each other.

2. The apparatus of claim 1, wherein each of the switches selects one of the paths for selecting one of the frequency bands generated by the connection of the paths.

3. The apparatus of claim 1, wherein the paths comprise:
- a ground plate connected to the radiation unit;
- a ground clip connected to the ground plate; and
- at least two ground lines comprising different lengths for connecting the ground clip to the switches.

4. The apparatus of claim 1, wherein the power feeder connecting unit comprises:
- a power feeding plate connected to the radiation unit;
- a power feeding clip connected to the power feeding plate; and
- a power feeding line for connecting the power feeding clip to the power feeder.

5. The apparatus of claim 1, wherein the radiation unit is spaced apart from the circuit board.

6. The apparatus of claim 1, wherein the radiation unit comprises a Planar Inverted F Antenna (PIFA) type radiation unit fed with current from the power feeder of the circuit board through the power feeder connecting unit for providing the fed current flow to the ground through at least one path of the ground connecting unit.

7. A portable terminal comprising an antenna apparatus for implementing characteristics of an ultra-wideband antenna using an antenna with narrow-band characteristics, the terminal comprising:
- a controller for modulating a voice signal and providing the modulated voice signal to a wireless communication unit; and
- a wireless communication unit for transmitting signals to the controller and transmitting a modulated signal received from the controller to the antenna apparatus; and an antenna apparatus comprising a radiation unit comprising a Planar Inverted F Antenna (PIFA) type radiation unit fed with current from a power feeder for providing the fed current flow to a ground through at least one path of a ground connecting unit, wherein the ground connecting unit comprises at least two paths comprising different lengths for electrically connecting the ground to and disconnecting the ground from the radiation unit, and the ground connecting unit further comprises switches connected to the paths, respectively, for connecting the ground to and disconnecting the ground from the radiation unit at high speed such that frequency bands generated by a connection of the at least two paths are overlapped with each other.

8. The terminal of claim 7, wherein the controller controls the antenna apparatus by adjusting a frequency band of the antenna apparatus into a wideband frequency.

9. The terminal of claim 7, wherein the antenna apparatus comprises a power feeder connecting unit for electrically connecting the power feeder for feeding power to the radiation unit.

10. A method for implementing characteristics of an antenna apparatus of a portable terminal, the method comprising:

modulating a voice signal received by a controller and providing the modulated voice signal to a wireless communication unit;

providing signals to the controller and transmitting the modulated signal received from the controller to the antenna apparatus;

electrically connecting a power feeder to a radiation unit for feeding electric power to the radiation unit; and electrically connecting a ground to and disconnecting the ground from the radiation unit, wherein the ground is electrically connected to and disconnected from the radiation unit according to paths selected by switches, and the switches connect the ground to and disconnect the ground from the radiation unit at high speed such that frequency bands generated by a connection of the paths are overlapped with each other.

11. The method of claim 10, wherein the radiation unit comprises a Planar Inverted F Antenna (PIFA) type radiation unit fed with current from the power feeder for providing the fed current flow to the ground through at least one path of a ground connecting unit.

* * * * *